(12) United States Patent
Huang

(10) Patent No.: US 6,386,494 B1
(45) Date of Patent: May 14, 2002

(54) BATH TOWEL HANGER BASE WITH A STRONG SUCTION DISC

(76) Inventor: Pao Ching Huang, No. 10, Lane 170, Nanlei Rd., Hemei Shiang, Changhua (TW)

( * ) Notice: Subject to any disclaimer, the term of this patent is extended or adjusted under 35 U.S.C. 154(b) by 0 days.

(21) Appl. No.: 09/642,087

(22) Filed: Aug. 21, 2000

(51) Int. Cl.[7] ................................................ F16M 13/00
(52) U.S. Cl. .......................... 248/205.8; 248/206.2; 248/363; 248/683; 211/119.009
(58) Field of Search ........................ 248/205.8, 205.7, 248/205.5, 206.2, 363, 683; 211/88.04, 16, 119.009, 119.011, 96, 100, 168

(56) References Cited

U.S. PATENT DOCUMENTS

| | | | | |
|---|---|---|---|---|
| 2,490,994 A | * | 12/1949 | Brown | 211/96 |
| 4,934,641 A | * | 6/1990 | McElhaney | 248/206.2 |
| 5,511,751 A | * | 4/1996 | Shen | 248/205.8 |
| 5,779,205 A | * | 7/1998 | Ching | 248/205.8 |
| 5,921,515 A | * | 7/1999 | Kimelman | 248/205.8 |
| 5,961,087 A | * | 10/1999 | Lee | 248/205.8 X |
| 5,970,860 A | * | 10/1999 | Yip | 248/205.8 X |
| 6,237,983 B1 | * | 5/2001 | Yang | 296/95.1 |

* cited by examiner

Primary Examiner—Daniel P. Stodola
Assistant Examiner—Erica B Harris
(74) Attorney, Agent, or Firm—Troxell Law Office PLLC

(57) ABSTRACT

A bath towel hanger base with a strong suction disc includes a base, a suction disc and a handling rod. The base and the suction disc are assembled together, with the handling rod added in the two components, to rotate the handling rod to control the suction disc to suck on or release from a wall so as to secure the base on a wall or release the base from the wall without harming the wall surface.

5 Claims, 6 Drawing Sheets

BATH TOWEL HANGER BASE WITH A STRONG SUCTION DISC

BACKGROUND OF THE INVENTION

This invention relates to a bath towel hanger with strong suction discs, particularly to one quickly installable, not harming a wall surface, having multi-use.

A known conventional bath towel hanger 10, shown in FIG. 1, includes a base 11 and screws 12 and a hang rod 20 as main components. The base 11 has a plurality of holes 111 in a front sidewall to receive screws 12 therein to engage screw sleeves 121 fixed in a wall W. The base 11 further has insert holes 112 in a sloped upper sidewall to receive hang rods 20 to enable a user to hang a bath towel or common towels on the hang rods 20.

However, the conventional bath towel hanger 10 is secured on the wall W by first boring holes W1 to fix the screw sleeves 121 therein for screws 12 to engage the screw sleeves 121. So installation of the conventional bath towel hanger 10 is rather complicated and inconvenient, needing a drill to bore the holes W1 in the wall W to fix the screw sleeves 121 for the screws 12. Consequently the wall W is harmed and if the bath towel hanger is to be relocated, the holes W1 remain and affect the appearance of the wall W.

SUMMARY OF THE INVENTION

The objective of the invention is to offer a bath towel hanger base with a strong suction disc that uses the suction disc to suck on the surface of a wall to quickly install the bath towel hanger and not harm the wall surface at the same time.

The features of the invention include a base, a suction disc, and a handling rod as main components. The base has an inner hollow space, a round opening in a rear side, a through shaft slot of a rectangular shape respectively in an upper and a bottom side aligned, and a plurality of insert holes in the upper side orderly arranged for hanging rods to insert therein. The suction disc has a sucking surface in a rear side, an annular limit wall in an intermediate portion to fit with an annular edge of the opening of the base, and a pull member on a front surface extending in the hollow space of the base. The pull member has a lateral shaft slot aligned to the shaft slots of the base and vertically crossing with the same shaft slots. The handling rod has a vertical portion passing through the shaft slots of the base and the shaft slot of the pull member and secured with a fix cap fixed on a top end of the vertical portion. The suction disc is combined with the base. The vertical portion of the handling rod has an eccentric portion located at the shaft slot of the pull member and a lateral portion extending from the lower end thereof that is located outside the bottom side of the base. The lateral portion can be swayed around to rotate vertical portion to pull the suction disc outward to suck strongly on a wall or move back to loosen from the wall.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
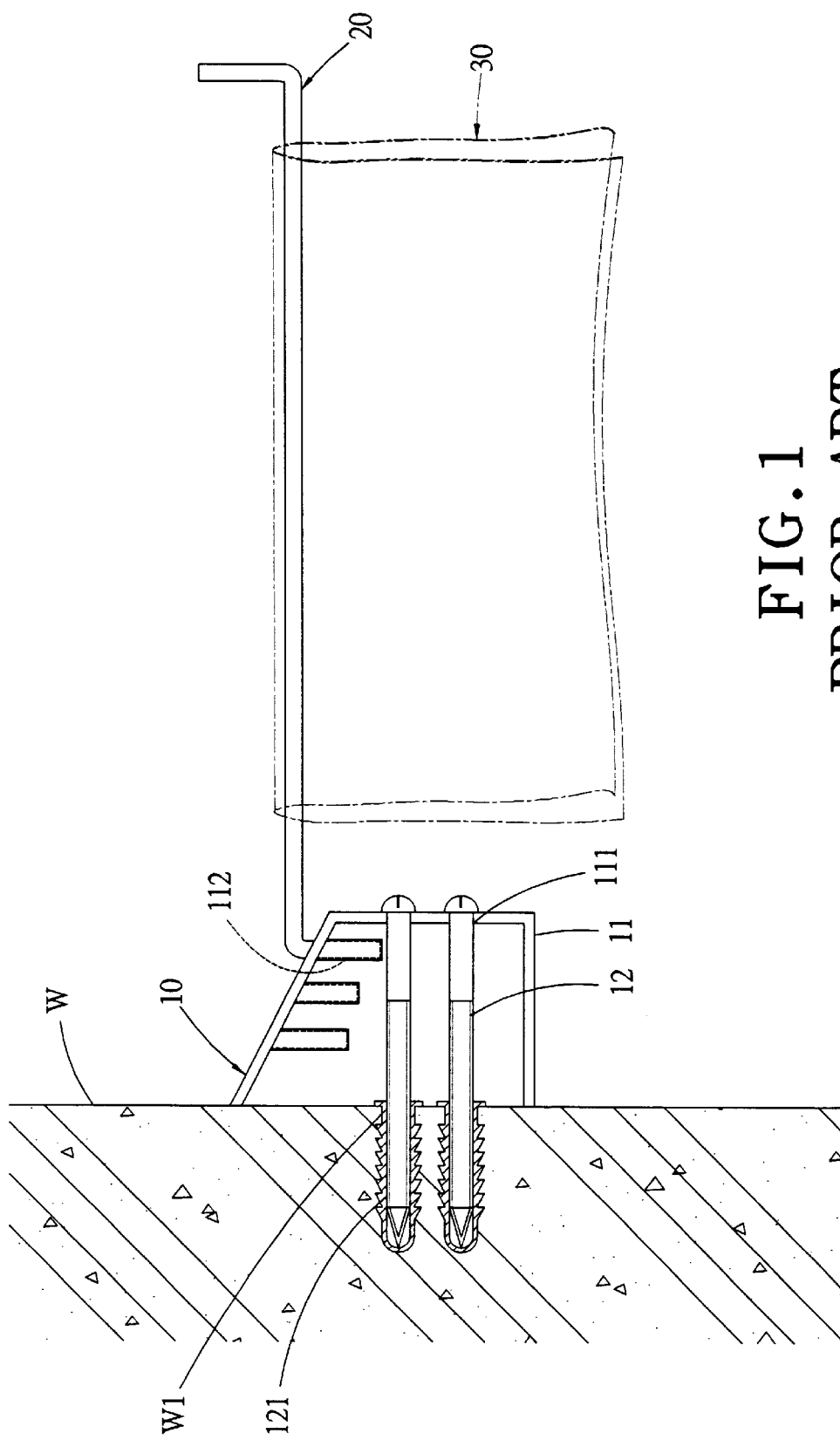
FIG. 1 is a side cross-sectional view of a known conventional bath towel hanger.
Figure 2:
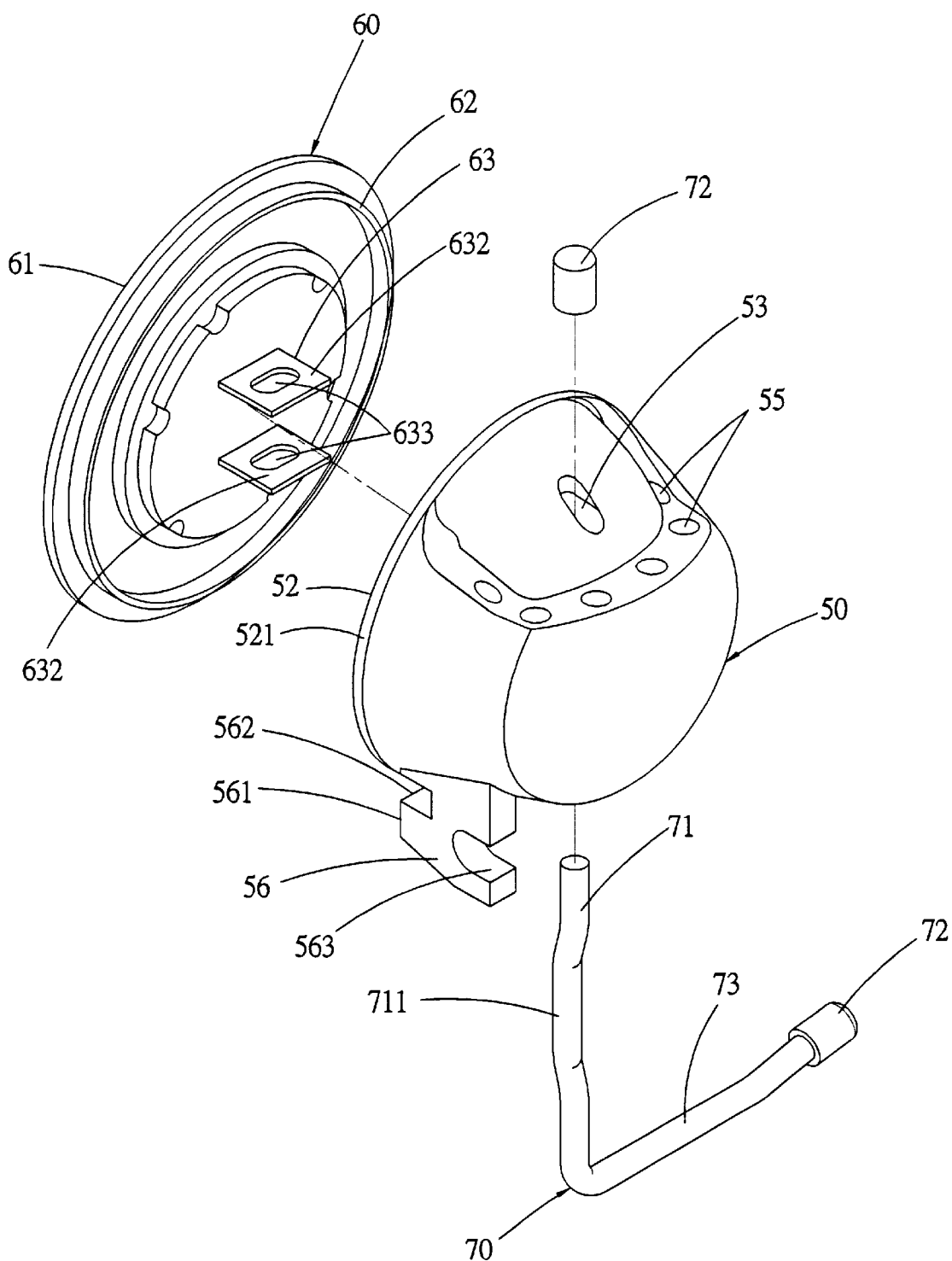
FIG. 2 is an exploded perspective view of a bath towel hanger base with a strong suction disc in the present invention.
Figure 3:
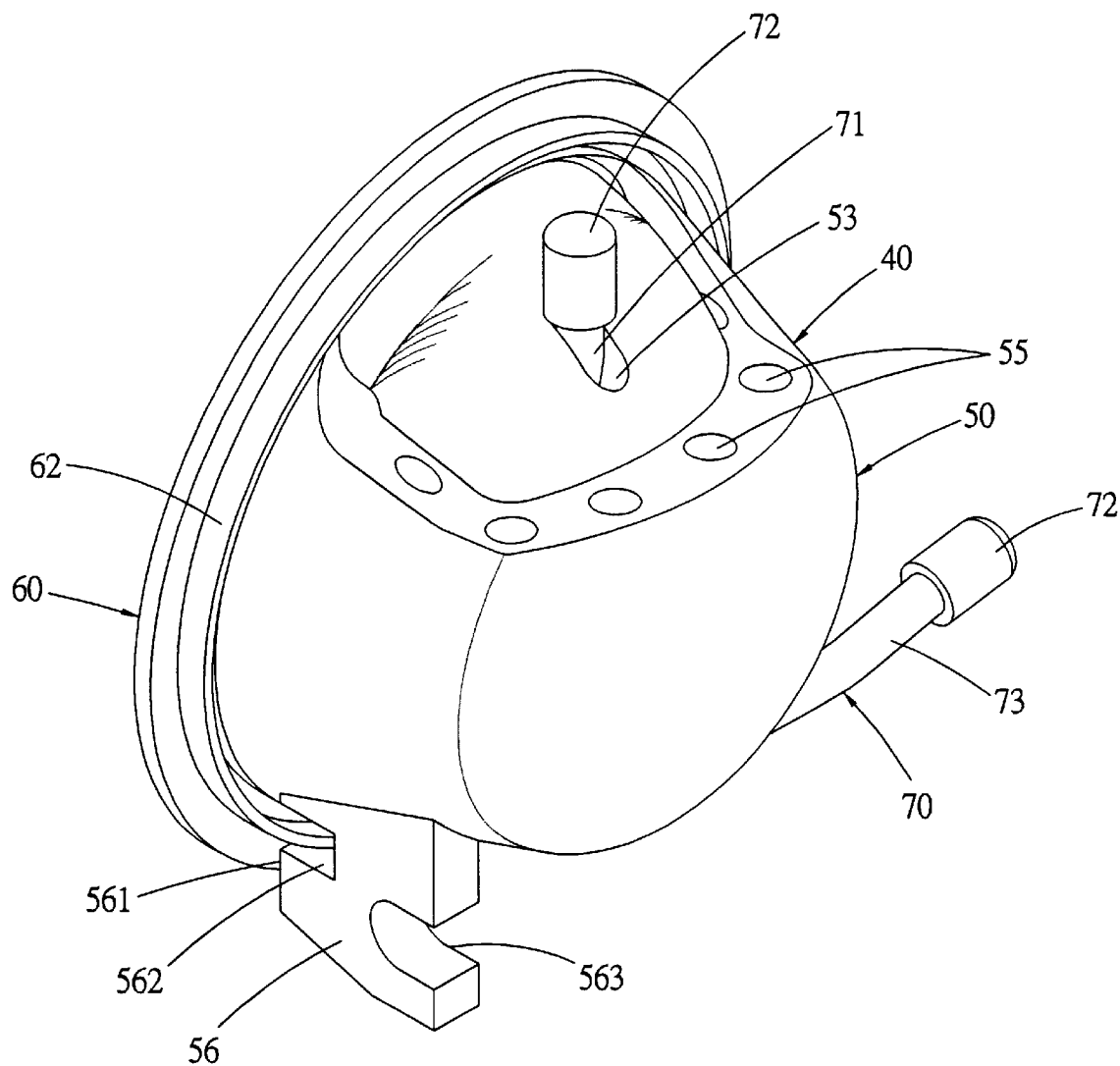
FIG. 3 is a perspective view of the bath towel hanger base with a strong suction disc in the present invention.
Figure 4:
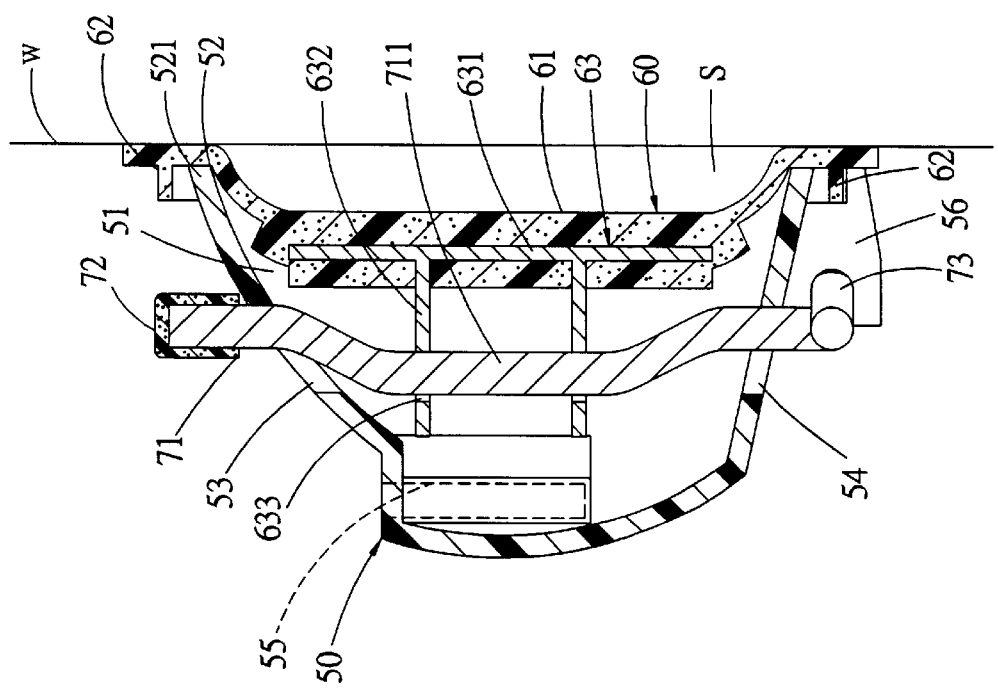
FIG. 4 is a cross-sectional view of the bath towel hanger base with a strong suction disc in the present invention.
Figure 5:
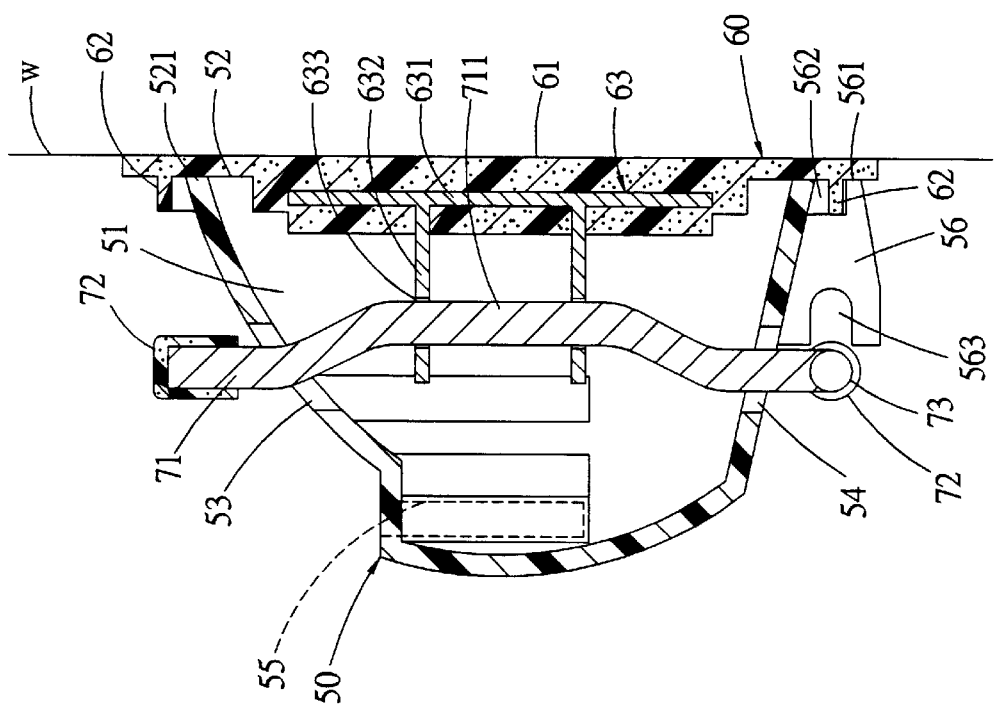
FIG. 5 is a cross-sectional view of the strong suction disc of the bath towel hanger base sucking on a wall surface in the present invention.

A bath towel hanger base with a strong suction disc 40 in the present invention, as shown in FIGS. 2, 3 and 4, includes a base 50, a suction disc 60, and a handling rod 70 as main components.

The base 50 is made integral of plastic, having an inner hollow space 51, a round opening 52 formed in a rear side defining the hollow space 51, a through shaft slot 53, 54 respectively formed in a nearly center section of an upper and a bottom side, and a plurality of insert holes 55 formed spaced apart equidistantly in a front edge of an upper side and surrounding the through shaft slot 53. Further, the base 50 has a press connector member 56 formed to extend down from the bottom side, where the press connector member 56 has a rear flat side 561 aligned to a circumferential edge 521 of the round opening 52; a notch 562 formed between the rear flat side 561 and the circumferential edge 521; and an engage groove 563 formed in a front side.

The suction disc 60 is made of an elastic material, having a sucking surface 61 in a rear side, a limit annular wall 62 formed in an intermediate portion to fit with the annular edge 521 of the round opening 52 and also received in the notch 562 of the rear flat side 561. Further, a pull member 63 is formed on a middle section of a front surface of the suction disc 60 extending in the hollow space 51 of the base 50, consisting of an inner bottom plate 631 and two parallel, vertical, pull plates 632 on the bottom plate 631. The inner bottom plate 631 is buried in the suction disc 60 during forming process, as shown in FIG. 4. The two parallel pull plates 632 extend forward from the suction disc 60, having a lateral shaft slot 633 aligned to the two shaft slots 53, 54 of the base 50.

The handling rod 70 is L-shaped, having a straight vertical portion 71 passing through the through shaft slots 53, 54 of the base 50 and also through the two lateral shaft slots 633 of the pull member 63 and a fix cap 72 fixed on an end to limit the position, securing the suction disc 60 with the base 50. The vertical portion 71 has a little eccentric push section 711 in the portion passing through the two lateral shaft slots 633. Further, a lateral portion 73 bent in a right angle from the vertical portion 71 located a little below the base 50, and also has a fix cap 72 fixed on an end. It is possible to sway the lateral portion 73 around.

Figure 7:
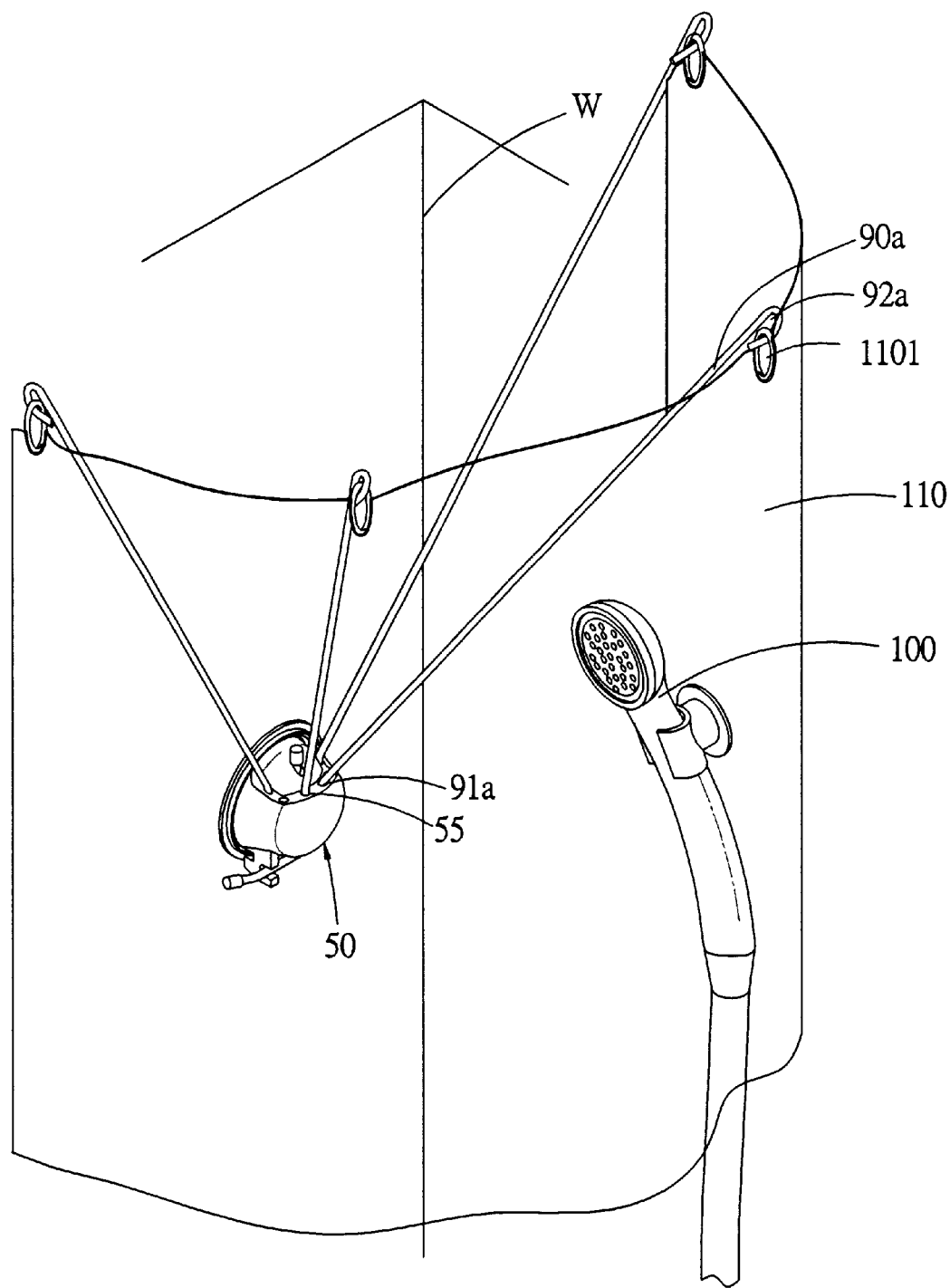

Next, how to use and handle the invention is to be described. When the bath towel hanger base 40 is secured on a bathroom wall W, referring to FIG. 4, manually hold and move the lateral portion 73 of the handling rod 70 toward the rear flat side 561 under the base 50 to let a part of the lateral portion 73 engage in the engage groove 563 and be secured in that position, as shown in FIG. 7. Meanwhile the lateral portion 73 also rotates the vertical portion 71, which has the eccentric section 711 between the two shaft slots 633 pushing the slot wall, and the eccentric push section 711 bias rotates to pull the pull member 63 to move toward the hollow space 51. This movement may force the circumferential edge 521 of the opening 52 push against the suction disc 60, and the pull member 63 pulls the middle section of the suction disc 60 toward the hollow space 51 of the base 50 so that the sucking surface 61 and the wall surface W may form a vacuum hollow sucking space S to effectively and strongly suck the bath towel hanger base 40 against the wall W. After the sucking surface 61 is secured, the rear flat side 561 of the press connector member 56 also pushes the outer side of the annular wall 62 of the suction disc 60, forming pressure to secure the suction disc 60 more stably on the wall W.

Figure 6:
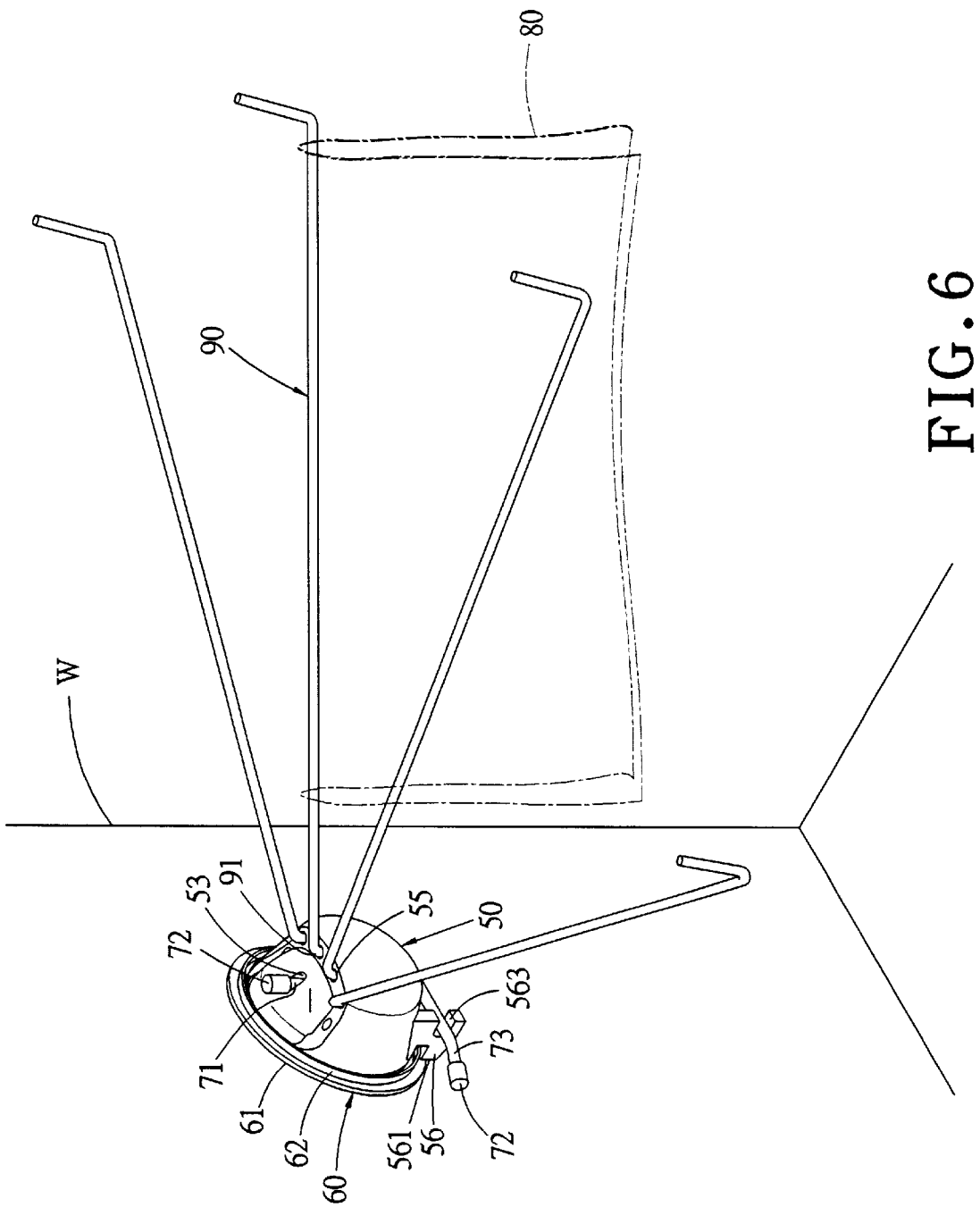
FIG. 6 is a perspective view of the towel hanger base combined with towel hangers for hanging a bath towel in the present invention: and, FIG. 7 is a perspective view of the bath towel hanger base combined with towel hangers for hanging a bath curtain in the present invention.

If the bath towel hanger base 40 is to be used for hanging towels, as shown in FIG. 6, proper towel hanging rods 90 are selected, each having one end bent vertically down to form an insert portion 91, which can be inserted in one of the insert holes 55 of the base 50. Then the towel-hanging rod 90 extends lateral from the base 50 for the towel 80 to hang thereon. If the base 50 is to be used for hanging a bath curtain, a shown in FIG. 7, the bath towel hanger base 40 is secured on a wall W near where a shower head is, and then a plurality of towel hanging rods 90a are combined with the base 40 with their bent down insert portions 91a inserted in the holes 55 and their outer ends provided respectively with a hook hole 92a to engage one of plural eye holes 1101 provided on an upper edge of the bath curtain 110. When the insert portions 91a are inserted in the holes 55, the towel hanging rod 90a slope upward to let the bath curtain hang down to surround a bathing space. Further, the insert portions 91a are pivotally inserted in the holes 55 so that the hanging rods 90a can sway its position to fold the bath curtain near to a wall W in case of no need or extend out for use.

The invention can be quickly installed or collapsed without harming a wall surface, very handy to apply, and in addition, various shapes and sizes of hanging rods may be used for different uses, making use of the strong suction disc movably sucking on a wall to secure the bath towel hanger base on the wall.

While the preferred embodiment of the invention has been described above, it will be recognized and understood that various modifications may be made therein and the appended claims are intended to cover all such modifications that may fall within the spirit and scope of the invention.

What is claimed is:

1. A bath towel hanger base comprising:

a base having an inner hollow space, a round opening formed in a rear side, a through shaft slot formed respectively in an upper side and a bottom side aligned with each other, said slots extending forward and rearward to form a rectangular shape, and a plurality of insert holes spaced apart equidistantly in a front edge of the upper side for hanging rods to insert therein;

a plurality of hanging rods on the base;

a suction disc having a flat sucking surface formed in a rear side, a limit annular wall formed in an intermediate portion to fit with an annular edge of said opening of said base, a pull member formed in a middle section of a front side to extend forward in said inner hollow space of said base, said pull member having a lateral shaft slot aligned to said two through shaft slots of said base, said pull member vertically crossing with said two shaft slots of said base;

an L-shaped handling rod having a vertical portion passing through said two through shaft slots of said base and also through said lateral shaft holes of said pull member of said suction disc, said vertical portion fixed with a fix cap on a top end to combine said suction disc with said base, said vertical portion having an eccentric section located to pass through-said lateral shaft holes of said pull member, a lateral portion extending from a lower end of said vertical portion and located outside of the bottom side of said base, said lateral portion able to be swayed roundly to rotate such that said eccentric section of said vertical portion may move to pull said suction disc toward said inner hollow space of said base to force said strong suction disc suck on a wall or release from the wall; and a press connector member formed to extend out from said annular edge of said opening of said base, having a press flat surface formed in a rear side; a notch formed in said press flat surface faces said limit annular wall of said suction disc and receives said limit annular wall therein in case of said suction disc sucking on a wall so as to let said flat press surface tightly press said suction disc; and an engage groove formed in an opposite side of said flat press surface receives said lateral portion of said handling rod therein.

2. The bath towel hanger base as claimed in claim 1, wherein said pull member of said suction disc consists of an inner vertical bottom plate and two parallel pull plates extending from said bottom plate inward, said inner vertical bottom plate is buried in said suction disc during a forming process, and said two parallel lateral plates extend outward.

3. The bath towel hanger base as claimed in claim 1, wherein said insert holes formed in said upper side of said base are located to surround said through shaft slot for said hanging rods to insert therein orderly.

4. The bath towel hanger base as claimed in claim 1, wherein said hanging rods each have one end bent down to form an insert portion to insert in one of said insert holes of said base for hanging towels thereon.

5. The bath towel hanger base as claimed in claim 1, wherein said hanging rods each have one end bent to form an insert portion, and the other end formed with a hang hole for an eye hole fixed on an upper edge of a bath curtain to hang thereon, said hanging rods extending upward slopingly to let said bath curtain hang down to surround a bathing space when said insert portions are inserted in said insert holes of said base.

* * * * *